(12) United States Patent
Suttman (10) Patent No.: US 11,577,616 B2
(45) Date of Patent: Feb. 14, 2023

(54) METHODS, SYSTEMS, AND APPARATUSES FOR TORQUE CONTROL UTILIZING ROOTS OF PSEUDO NEURAL NETWORK

(71) Applicant: GM GLOBAL TECHNOLOGY OPERATIONS LLC, Detroit, MI (US)

(72) Inventor: Dana J. Suttman, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 17/081,087

(22) Filed: Oct. 27, 2020

(65) Prior Publication Data

US 2022/0126702 A1 Apr. 28, 2022

(51) Int. Cl.
*G06N 3/02* (2006.01)
*B60L 15/20* (2006.01)
*B60W 10/06* (2006.01)

(52) U.S. Cl.
CPC ............. *B60L 15/20* (2013.01); *B60W 10/06* (2013.01); *G06N 3/02* (2013.01); *B60L 2240/423* (2013.01); *B60W 2710/0666* (2013.01)

(58) Field of Classification Search
CPC ........... B60W 10/06; B60W 2710/0666; B60L 15/20; B60L 2240/423; G06N 3/02
See application file for complete search history.

(56) References Cited

U.S. PATENT DOCUMENTS

| 10,657,598 B2 * | 5/2020 | Lavie ..................... G06Q 40/08 |
| 2010/0179935 A1 * | 7/2010 | Srinivasa ............... G06N 3/049 706/21 |
| 2012/0078472 A1 * | 3/2012 | Neal ........................ B60R 25/00 701/45 |

* cited by examiner

*Primary Examiner* — Edwin A Young
(74) *Attorney, Agent, or Firm* — Lorenz & Kopf LLP (57) ABSTRACT

In various embodiments, methods, systems, and vehicle apparatuses are provided. A method for implementing torque control using a Neural Network (NN) for a torque prediction model to receive a set of measured vehicle operating inputs associated with torque prediction; substituting a set of multiple independent variables into the torque prediction model so that the NN is then taking the form of a simplified pseudo-NN that contains a reduced variable set of one independent variable; processing, the set of measured vehicle operating inputs by the pseudo-NN based on the NN prediction model by using only one independent variable in a pseudo-NN's simplified mathematical expression; and solving for at least one root of the pseudo-NN's simplified mathematical expression by obtaining a root value without having to rely on an inversion operation of a mathematical expression that consists of an entire set of independent variables.

20 Claims, 3 Drawing Sheets

METHODS, SYSTEMS, AND APPARATUSES FOR TORQUE CONTROL UTILIZING ROOTS OF PSEUDO NEURAL NETWORK

INTRODUCTION

The present disclosure generally relates to vehicles and more particularly relates to methods, systems, and apparatuses for assuming an Artificial Neural Network (ANN) for torque prediction then applying torque control in a way which avoids complex mathematical inversion by reducing variables numbers of the ANN to a single variable(s), creating a "Pseudo ANN" enabling solving the variables' root for advanced process control variables.

Engine control systems have been developed to attempt to accurately control engine torque output to achieve the desired engine torque. Traditionally, torque prediction models, when implemented, require the results "inverted" for control use. That is, only with a subsequent inversion step of the output can the results from a torque prediction model be used to allow for responsive vehicle control.

There are desired prediction processes that do not require the inversion step when implementing a torque prediction model as the need for an inversion operation can prove unduly cumbersome and difficult to implement conveniently. This is especially the case when using a prediction model that is a highly non-linear model like an ANN.

Accordingly, it is desirable to provide methods, systems, and apparatuses that for torque control, which solves artificial neural networks for its roots via Spark or Air Per Cylinder (APC) control variables. The method of torque control aims to allow ANN-based torque prediction that can then be used for control as well.

Furthermore, other desirable features and characteristics of the present disclosure will become apparent from the subsequent detailed description and the appended claims, taken in conjunction with the accompanying drawings and the foregoing technical field and background.

SUMMARY

In at least one exemplary embodiment, a method for implementing torque control using a Neural Network (NN) is provided. The method includes in response to a torque request, executing, by a processor, a torque prediction model of the NN to receive a set of measured vehicle operating inputs associated with torque prediction; substituting a set of multiple independent variables of the torque prediction model implemented by the NN for a simplified mathematical expression in a pseudo-NN that contains a reduced variable set including at least only one independent variable to replace a prior set of multiple independent variables of the NN; processing, the set of measured vehicle operating inputs by the pseudo-NN based on the torque prediction model by using at least only one independent variable and one or more constants substituted for a set of substituted independent variables in a pseudo-NN's simplified mathematical expression; and solving for at least one root of the pseudo-NN's simplified mathematical expression by obtaining a root value without having to rely on an inversion operation of a mathematical expression that consists of an entire set of independent variables to obtain a requested torque value.

In at least one embodiment, the method further includes solving, by the processor, for at least one root of the pseudo-NN's simplified mathematical expression to obtain a root value to predict a change in an air-per-cylinder (APC) control to obtain the requested torque value.

In at least one embodiment, the method further includes solving, by the processor, for at least one root of the pseudo-NN's simplified mathematical expression to obtain a root value to predict a difference in spark control to change engine timings to obtain the requested torque value.

In at least one embodiment, the method further includes solving for at least one root of the pseudo-NN's simplified mathematical expression without having to rely on an inversion operation despite a high level of the nonlinearity of the NN.

In at least one embodiment, the method further includes applying, by the processor, the torque prediction model, including the composition of an activation function with multiple hidden layers wherein using a root solving algorithm to solve the simplified mathematical expression for a single remaining variable.

In at least one embodiment, the method further includes the set of measured inputs include intake cam phasers (ICAM), exhaust cam phasers (ECAM), revolutions per minute (RPM), APC, and spark timings of an operating vehicle.

In at least one embodiment, the method further includes the pseudo-NN includes a pseudo artificial NN (ANN) wherein the pseudo-ANN is a simplification of the trained prediction model.

In another, at least one embodiment a system is provided. The system includes a set of inputs obtained by a processor that pertain to one or more measurements of vehicle operations used to predict a torque requested of a vehicle; a vehicle control system instructed by a torque prediction model implemented by the processor using an artificial neural network (ANN) to solve for a root of the prediction model used to obtain the torque request; in response to the torque request, the processor configured to execute the torque prediction model of the ANN to receive a set of measurements as inputs for torque prediction; the processor configured to substitute a set of multiple independent variables of the torque prediction model implemented by the ANN to formulate a functional mathematical expression in a pseudo-ANN that contains a reduced variable set including only one independent variable of a reduced set including multiple independent variables used by the ANN; the processor configured to receive the set of measurements of a current operating vehicle as inputs to the pseudo-ANN for applying the torque prediction model with a single independent variable and one or more constants that have been substituted for a complete set of independent variables; the processor configured to process the single independent variable in a pseudo-ANN that contains a simplified mathematical expression; and the processor configured to solve for at least one root of the pseudo-ANN's simplified mathematical expression to obtain a root value without having to rely on an inversion operation of a mathematical expression that consists of an entire set of independent variables for predicting a requested torque value.

In at least one embodiment, the system further includes the processor configured to solve for at least one root of the pseudo-ANN's simplified mathematical expression to obtain a root value to predict a change in an air-per-cylinder (APC) control to obtain the requested torque value.

In at least one embodiment, the method further includes the processor configured to solve for at least one root of the pseudo-ANN's simplified mathematical expression to obtain a root value to predict a difference in spark control to change engine timings to obtain the requested torque value.

In at least one embodiment, the system further includes the processor configured to solve for at least one root of the pseudo-ANN's simplified mathematical expression without having to rely on an inversion operation despite a high level of the nonlinearity of the ANN.

In at least one embodiment, the system further includes the processor configured to apply the torque prediction model, including the composition of an activation function with multiple hidden layers wherein using a root solving algorithm to solve the expression for a single remaining variable.

In at least one embodiment, the system further includes the set of measured inputs include intake cam phasers (ICAM), exhaust cam phasers (ECAM), revolutions per minute (RPM), APC, and spark timings of an operating vehicle.

In at least one embodiment, the system further includes the pseudo-ANN as a trained prediction model.

In yet another at least one embodiment, a vehicle apparatus is provided. The vehicle apparatus includes a vehicle controller including a processor wherein the processor is coupled to a neural network (NN) and configured to: execute a torque prediction model of the NN to receive a set of measured vehicle operating inputs associated with torque prediction; substitute a set of multiple independent variables of the torque prediction model implemented by the NN for a simplified mathematical expression in a pseudo-NN that contains a reduced variable set including one independent variable; process the set of measured vehicle operating inputs by the pseudo-NN based on the torque prediction model by using at least only one independent variable and one or more constants substituted for a set of substituted independent variables in a pseudo-NN's simplified mathematical expression; and solve for at least one root of the pseudo-NN's simplified mathematical expression by obtaining a root value without having to rely on an inversion operation of a mathematical expression that consists of an entire set of independent variables to obtain a requested torque value.

In at least one embodiment, the vehicle apparatus further includes the set of measured inputs include intake cam phasers (ICAM), exhaust cam phasers (ECAM), revolutions per minute (RPM), APC, and spark timings of an operating vehicle.

In at least one embodiment, the vehicle apparatus further includes the processor configured to: solve for at least one root of the pseudo-NN's simplified mathematical expression to obtain a root value to predict a change in an air-per-cylinder (APC) control to obtain the requested torque value.

In at least one embodiment, the vehicle apparatus further includes the processor configured to: solve for at least one root of the pseudo-NN's simplified mathematical expression to obtain a root value to predict a difference in spark control to change engine timings to obtain the requested torque value.

In at least one embodiment, the vehicle apparatus further includes the processor configured to: solve for at least one root of the pseudo-NN's simplified mathematical expression without having to rely on an inversion operation despite a high level of the nonlinearity of the NN.

In at least one embodiment, the vehicle apparatus includes the processor configured to: apply the torque prediction model, including the composition of an activation function with multiple hidden layers wherein a root solving algorithm is used to solve the expression for a single remaining variable.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Vehicle system control involves driver and vehicle inputs and includes vehicle sensor data and torque requests, and communicating these inputs to an Engine Control Module (ECM) and a Transmission Control Module (TCM). The ECM may calculate a driver axle torque requested from the driver and vehicle inputs. The driver axle torque requested may then be communicated to the engine and to the ECM. The ECM can receive inputs such as the intake cam phasers (ICAM), exhaust cam phasers (ECAM), vehicle speed or revolutions per minute (RPM), air-per-cylinder (APC), and engine timing data or electronic spark control (SPARK) data. The change in APC and SPARK are responsive to a desired torque request by the driver.

The present disclosure provides methods, systems, and apparatus that enable torque control which avoids complex mathematical inversion by simplifying an Artificial Neural Network (ANN) down to a single variable "Pseudo ANN" to solve for its roots via SPARK or APC control variables (i.e., changes in APC or SPARK).

Figure 1:
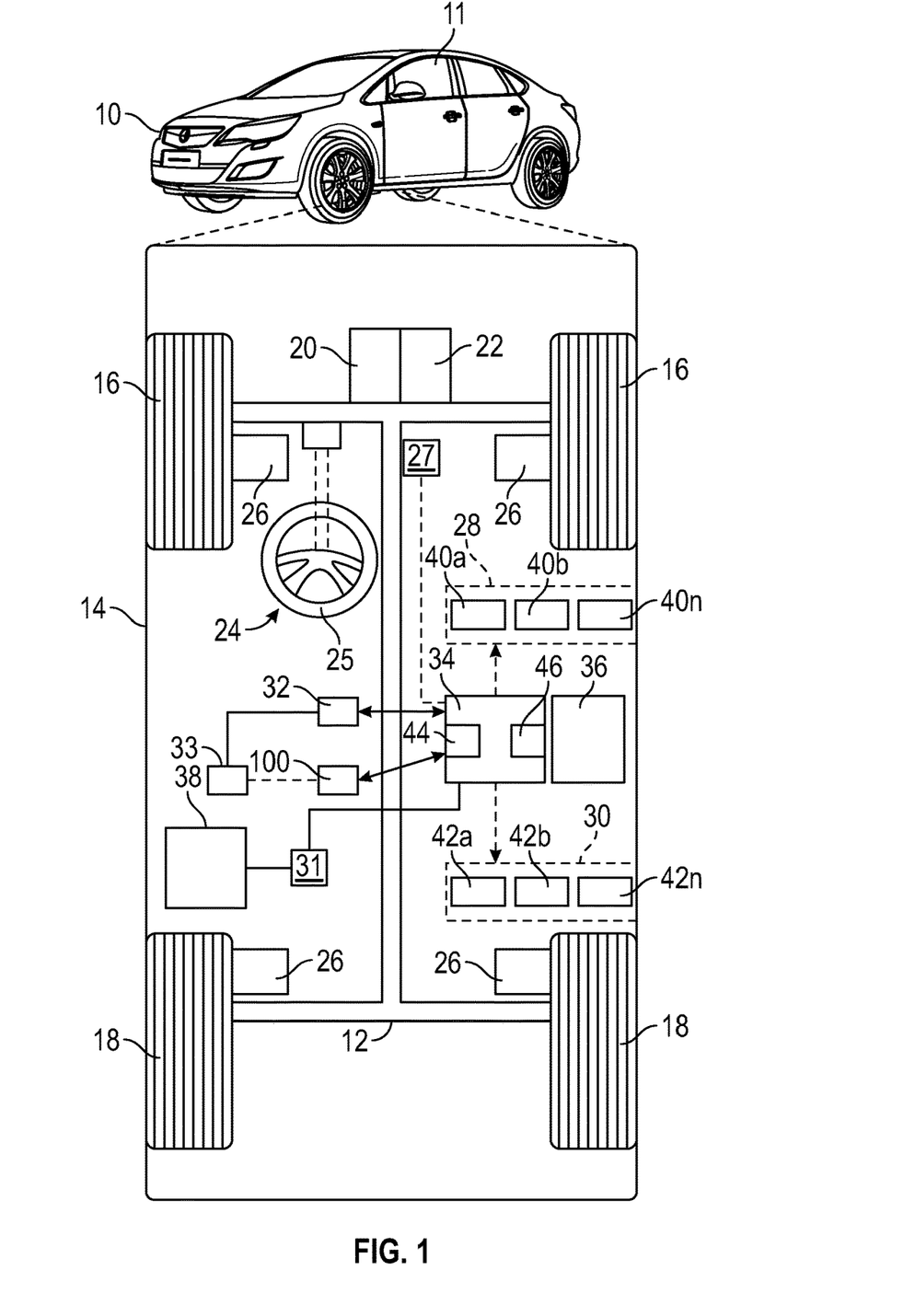
FIG. 1 is a functional block diagram illustrating an autonomous or semi-autonomous vehicle having a control system that controls vehicle actions based on using a neural network to predict torque characteristics in a vehicle control system, in accordance with exemplary embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) based on a trained pseudo-ANN model that controls operation in response to data from vehicle inputs, for example, as described in greater detail further below in connection with FIGS. 2-4.

In various exemplary embodiments, the system 100 is enabled to reduce dimensionality and complexity during the control step despite a high level of nonlinearity in ANNs desired in a prediction. The system 100 provides a torque prediction model that simplifies solving a one-dimensional non-linear function for its roots, rather than attempting to compute a mathematical inverse of a high degree of freedom, non-invertible ANN expression. The system 100 provides a new control method to be paired with ANNs as prediction models. This process avoids the need for full mathematical function inversion of an ANN. This process is enabled by first creating a simplified "Pseudo-ANN" with one variable, then solves it for its roots (zeros).

In various exemplary embodiments, the system 100 provides a process using an algorithm that controls torque in a vehicle's 10 embedded controller software of the system 100 allowing ANNs to be used for a torque prediction model. The process enables the avoidance of the need for computations of a full mathematical inversion of a highly non-linear ANNs (complex), and instead first reduces ANN dimensionality and then leverages a simple root solving algorithm to control the system 100 to a driver requested torque.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous or semi-autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network 33) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84 34 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally also includes a propulsion system 20, a transmission system 22, a brake system 26, one or more user input devices 27, a sensor system 28, an actuator system 30, at least one data storage device 32, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes a vehicle controller that will be directly affected based on the neural networks 33 model's output. In an exemplary embodiment, a feed-forward operation can be applied for an adjustment factor that is the continuous output of the neural network 33 models to generate a control action for the desired torque or other like action (in case of a continuous neural network 33 models, for example, the continuous APC/SPARK prediction values are outputs).

In various embodiments, one or more user input devices 27 receive inputs from one or more passengers (and driver 11) of the vehicle 10. In various embodiments, the inputs include a desired destination of travel for the vehicle 10. In certain embodiments, one or more input devices 27 include an interactive touch-screen in the vehicle 10. In certain embodiments, one or more inputs devices 27 include a speaker for receiving audio information from the passengers. In certain other embodiments, one or more input devices 27 may include one or more other types of devices and/or may be coupled to a user device (e.g., smartphone and/or other electronic devices) of the passengers.

The sensor system 28 includes one or more sensors 40a-40n that sense observable conditions of the exterior environment and/or the interior environment of the vehicle 10. The sensors 40a-40n include but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, canister purge system 31, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

Figure 2:
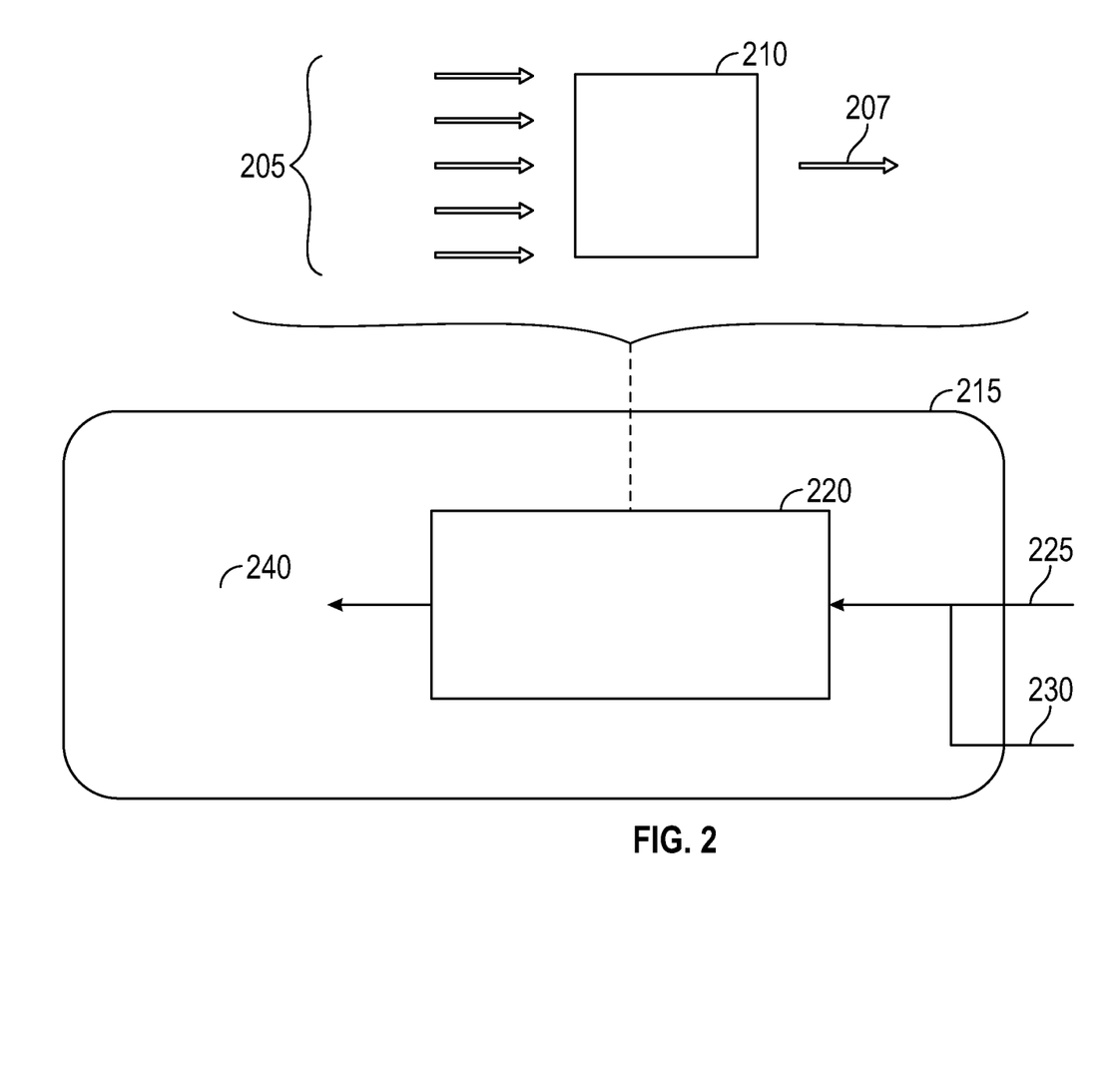
FIG. 2 is a diagram illustrating a pseudo neural network system which can be implemented with an APC or SPARK controller using the neural network to predict torque characteristics of a vehicle control system, in accordance with various embodiments.

The data storage device 32 store data for use in automatically controlling the vehicle 10, including the storing of data of a pseudo-ANN used to predict a driver requested torque used for the vehicle control. In various embodiments, the data storage device 32 stores a machine learning model of a pseudo-ANN and other data models such as defined maps of the navigable environment. The pseudo-ANN itself is not trained. The model training takes place for an ANN prediction model (See. FIG. 2, ANN prediction model (210)). There is no separate training required for the pseudo-ANN rather, the ANN prediction model (i.e., ANN prediction model) is implemented with a set of values. In various embodiments, the pseudo-ANN may be predefined based on the ANN prediction model configured with a set of values by and obtained from a remote system. For example, the neural network 33 (i.e., ANN prediction model) may be trained by a supervised learning methodology by a remote system and communicated or provisioned in the vehicle 10 (wirelessly and/or in a wired manner) and stored in the data storage device 32. The ANN prediction model can also be trained via supervised or unsupervised learning based on vehicle data.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 implements the logic model for the pseudo-ANN based on the ANN prediction model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may also facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

With reference now to FIG. 2, FIG. 2 is an exemplary diagram illustrating an APC controller that uses the pseudo-ANN root solver of the pseudo-ANN for the torque prediction model in accordance with an embodiment. The torque prediction model is implemented by the pseudo-ANN system and avoids complex ANN inversion techniques. The APC controller is paired with an ANN that can be implemented with an APC controller using the neural network to predict torque characteristics based on measured vehicle inputs in accordance with various embodiments. The ANN resolves issues in torque prediction accuracy and calibration effort that can occur in vehicle operations.

In an exemplary embodiment, a current calibration process may be based on ever-increasing numbers (~52) of calibration lookup tables. The process can be enabled to tolerate higher dimensionality than a conventional process and also to handle increases in engine performance by a faster ability to perform the necessary torque calibrations.

In FIG. 2, in exemplary torque prediction system 200 there is included a torque prediction model pseudo 210 (i.e., an implemented pseudo-ANN structure) which is embedded in an ECU with a set of measured inputs 205 that include the inputs of current vehicle operations related to RPM, ICAM, ECAM, APC, and SPARK. Also included is an output 207 of the torque prediction model that generates a predicted torque based on the measured inputs 205 to the torque prediction model. Further, in an exemplary embodiment, the APC control 215 operates for torque control with fixed variables of RPM, ICAM, and ECAM. In an exemplary embodiment, when a driver requests a new or a desired torque, the APC control 215 operates to make a change in the values of either or both the APC and SPARK inputs to achieve an output that closely approximates the requested torque value. For example, the driver 225 may make a request for the desired torque, and this torque request is received as input to the pseudo-ANN root solver processor 220; additionally, the set of inputs can include the current RPM, ICAM, ECAM, and SPARK are received from the vehicle operating. The pseudo-ANN root solver processor 220 implements the ANN torque prediction model 210 based on the set of measured inputs received that represent measured operating conditions of the vehicle's current RPM, ICAM, and ECAM for receipt by a pseudo-ANN model to perform a root solve in place of traditional inversion methods. The pseudo-ANN is based on a prediction model with values which is trained already offline; therefore, the ANN can be considered a trained supervised or unsupervised model. The pseudo-ANN model outputs a desired APC 240 to achieve the requested torque 225. Also, the pseudo-ANN root solver processor 220 can also be applied again with a current SPARK input.

In an exemplary embodiment, the trained ANN torque prediction model is a statistical-based Machine Learning technique called Deep Artificial Neural Network (ANN) to predict brake torque in ECU's embedded software. This method can replace complex traditional lookup table based methods for increased accuracy and improved calibration efforts. The ANN increases torque prediction accuracy and calibration effort in the current software and calibration processes caused by ever-increasing numbers (~52) of calibration lookup tables.

In an exemplary embodiment, the trained ANN torque prediction model is implemented with an ANN prediction model or algorithm that is configured with various elements, including a data division: of approximately 80% training, 20% testing; Inputs/Outputs: 5 inputs, 1 output; Inputs: RPM, ICAM, ECAM, APC, Spark; Output: brake torque; Neuron Count per hidden Layer: 12-18; Hidden Layers: 2+("Deep"); and an activation function of a tangent sigmoid.

In an exemplary embodiment, the ANN torque prediction model is configured by the steps enabled for deep ANN and for calibration by dyno data collected using a design of experiment (DoE) that covers a full range of the input space in a pseudo-space-filling configuration. For example, for the data collection process may be performed by a calibrator that executes a MATLAB® algorithm to train the deep ANN and to import the DoE dyno data when prompted. The user inputs only data, algorithm details, options, and structure, which are automatically configured by the algorithm. The training algorithm is executed and outputs a final ANN model with optimally selected weights and biases parameters, which renders a model that exhibits enhanced torque prediction. The calibrator considers a set of results that are plot automatically for output by the algorithm to ensure an appropriate set of requirements are met. The calibrator embeds the weights and biases selected by the algorithm into software hosted by the ECU for calibration. The ANN torque prediction model that is configured can enable a set of vehicle measurements as inputs that can exhibit a wider degree of freedom (i.e., compared to tabular methodologies). The wider freedoms include RPM, ICAM, ECAM, APC, SPARK, and others. Further, the degrees of freedom is not limited to the use of a conventional set vehicle measurements that include the RPM, ICAM, and ECAM, nor are the freedoms limited by to the expanded set vehicle measurements that include the RPM, ICAM, ECAM, APC, SPARK but may be expanded to include other variables as desired to ensure modeling with appropriate numbers (i.e., greater degrees of accuracy) accuracies and other variable considerations.

In various exemplary embodiments, the prediction logic that is implemented by offline training is either logic derived from supervised or unsupervised learning processes and can be enabled using other neural networks, other neural networks that include trained convolutional neural network (CNN) and/or recurrent neural network (RNN) in which the root solve methodology can be applied and used in vehicle operations. In addition, alternate embodiments can be considered that include a neural network composed of multiple layers (i.e., 3 layers) of convolutional neural network (CNN) and also with dense layers (i.e., 2 dense layers) that have been trained offline and enable control of operations in coordination with the system illustrated in FIG. 1, in accordance with various embodiments.

The neural network is used to inform the APC/SPARK controller of torque characteristics and is configured as an already trained neural network. Hence, in certain embodiments, the process of the torque prediction system is configured in an operational mode only. For example, in various embodiments, the neural network is trained during a training mode prior to use or provisioned in the vehicle (or other vehicles). Once the neural network is trained, it may be implemented in a vehicle (e.g., the vehicle 10 of FIG. 1) in an operational mode, in which the vehicle is operated in an autonomous, semi-autonomous or manual manner.

In various alternative exemplary embodiments, it will be appreciated that the neural network may also be implemented in both the training mode and the operational mode in a vehicle and trained during an initial operation period in conjunction with operations of a time delay or like methodology for torque control predictions. Also, a vehicle may operate solely in the operating mode with neural networks that have already been trained via a training mode of the same vehicle and/or other vehicles in various embodiments.

Figure 3:
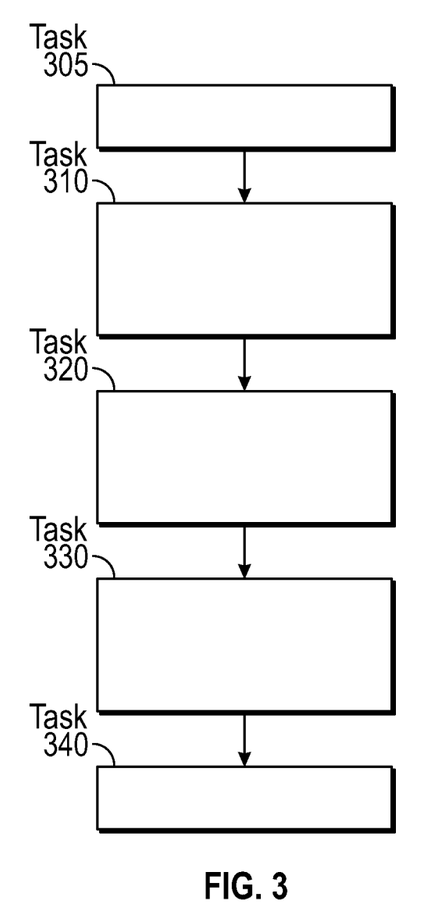
FIG. 3 is a functional block diagram illustrating a pseudo artificial neural network (ANN) implemented to predict APC and SPARK changes for a requested torque illustrated in FIGS. 1-2, in accordance with various embodiments.

FIG. 3 illustrates an exemplary flowchart for the APC control of the torque prediction system in accordance with an embodiment. In FIG. 3, the APC control is initiated using the ANN at task 305. It is expected that if an ANN were to be used for the prediction model, there would be no reasonable way to control this type of ANN model using mathematical inversion. This is because the true inversion of an ANN is a highly complex method and computation, and depending on the ANN structure, it may not be possible without recently published numerical estimation methods. The process describes in flowchart 300 of FIG. 3 avoids the need for mathematical inversion of an ANN altogether, opening up the possibility of using ANNs for the prediction model and while still providing an avenue for control of the model, which may not have been feasible otherwise. The process reduces the dimensionality of the mathematical expression, the ANN expression complexity, the need for true inversion, the computational complexity, while still meeting requirements for an appropriate level of torque control.

In FIG. 3, in task 310, the ANN receives a set of "n" inputs that includes a plugin of actual RPM, a plugin of actual ICAM, a plugin of actual ECAM, APC, and the plugin of actual SPARK. At task 310, Substitute fixed current values into the ANN for 5 of the 5 independent variables. At task 320, simplify expression down to the function of one variable APC. This will be a composition of activation functions $\emptyset$ due to multiple hidden layers in the ANN structure. Set expression equal to the torque the driver desires $T_{Des}$.

The $T_{Des}=A+B*\emptyset(\emptyset(\ldots APC))+\ldots+C*\emptyset(\emptyset(\ldots APC))$ where T, A, and B are now constants and $\emptyset$ is the NN activation function selected.

At task 330 uses a non-linear root solving algorithm to solve this expression for the only remaining variable APC (i.e., find the roots of this expression).

That is, $0=-T_{Des}+A+B*\emptyset(\emptyset(\ldots APC))+\ldots+C*\emptyset(\emptyset(\ldots APC))$ where the APC is the desired APC=Root 1, Root 2, etc. . . . and again T, A, and B are constants and $\emptyset$ is the NN activation function selected.

In another exemplary embodiment, the same or similar three-step process described above may be applied in another cycle for spark by leaving spark as the remaining variable and solving for spark for a desired torque value requested by the driver.

Figure 4:
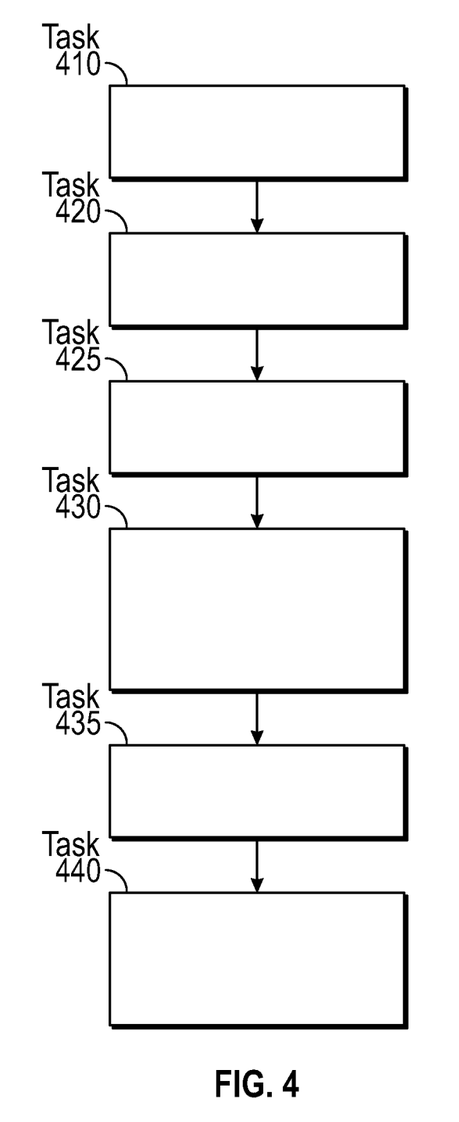
FIG. 4 illustrates an exemplary flowchart that illustrates the steps for use in the control method for torque control illustrated in FIGS. 1-2, in accordance with various embodiments.

FIG. 4 illustrates an exemplary flowchart that illustrates the steps for use in the control method for torque control in accordance with an embodiment. In FIG. 4, the process includes the following tasks. Task 410, An ANN is embedded into ECU as a torque prediction model. Then at task 420 and task 425, the three-step control process is applied in consecutive multiples (i.e., two times) to determine the roots in the first cycle for the desired APC value at task 420 and in the second cycle at task 425 to determine the desired SPARK value. The logic that is implemented by historical or expert know-how, or by empirical testing of different logic schema from a list of roots at task 430 discovered that enable the APC or SPARK control for the desired driver requested torque. The selected root is implemented at task 435 as a control variable in a software control module to obtain driver requested torque. The converted desired APC root (or spark root) at task 440 is implemented via a set of constants (i.e., the constants T, A, and B) and the NN activation function ∅ selected used in the control module.

In various exemplary embodiments, the features sent as inputs to the prediction model may include other vehicle operating measurements such as engine speed, air mass per cylinder event, purge valve duty cycle, wastegate position (optional), oxygen sensor output, fueling command, cam phaser position, manifold air pressure, manifold air temperature, spark timing, boost pressure ratio (optional), and throttle position. The set of input features presented should not be considered all-encompassing. For example, the input set of "n" inputs can be augmented, changed, or reduced depending on the inputs required in the operation of the torque control system.

An output from the neural network is a continuous output to instruct a vehicle controller to execute an action that affects the torque value. In various exemplary embodiments, the output from the neural network is configured as a continuous output to instruct a vehicle controller to execute a control action to control the value of a predicted torque. In various embodiments, the ANN is stored in a memory on board the vehicle, such as the computer-readable storage device or media 46 of FIG. 1.

In various embodiments, the disclosed methods, systems, and vehicles provide for a canonical representation of the output of a hybrid recurrent neural network, along with the use of a deep neural network to regress over this canonical representation and to predict vehicle actions (e.g., torque actions) for a vehicle using multiple neural networks, as described above.

As mentioned briefly, the various modules and systems described above may be implemented as one or more machine learning models that undergo supervised, unsupervised, semi-supervised, or reinforcement learning. Such models might be trained to perform classification (e.g., binary or multiclass classification), regression, clustering, dimensionality reduction, and/or such tasks. Examples of such models include, without limitation, artificial neural networks (ANN) (such as a recurrent neural network (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation-maximization, hierarchical clustering, etc.), and linear discriminant analysis models.

It should be appreciated that process of FIGS. 1-4 may include any number of additional or alternative tasks, the tasks shown in FIGS. 1-4 need not be performed in the illustrated order and process of the FIGS. 1-4 may be incorporated into a more comprehensive procedure or process having additional functionality not described in detail herein. Moreover, one or more of the tasks shown in FIGS. 1-4 could be omitted from an embodiment of the process shown in FIGS. 1-4 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for implementing torque control of a vehicle using a Neural Network (NN) comprising:
   in response to a torque request, executing, by a processor, a torque prediction model of the NN to receive a set of measured vehicle operating inputs associated with torque prediction;
   substituting a set of multiple independent variables of the torque prediction model implemented by the NN for a simplified mathematical expression in a pseudo-NN that contains a reduced variable set comprising at least only one independent variable to replace a prior set of multiple independent variables of the NN;
   processing, the set of measured vehicle operating inputs by the pseudo-NN based on the torque prediction model by using at least only one independent variable and one or more constants substituted for a set of substituted independent variables in a pseudo-NN's simplified mathematical expression; and
   solving for at least one root of the pseudo-NN's simplified mathematical expression by obtaining a root value without having to rely on an inversion operation of a mathematical expression that consists of an entire set of independent variables to obtain a requested torque value; and
   generating one or more control signals to the vehicle based on the requested torque value.

2. The method of claim 1, further comprising:
   solving, by the processor, for at least one root of the pseudo-NN's simplified mathematical expression to obtain a root value to predict a change in an air-per-cylinder (APC) control to obtain the requested torque value.

3. The method of claim 2, further comprising:
   solving, by the processor, for at least one root of the pseudo-NN's simplified mathematical expression to obtain a root value to predict a difference in spark control to change engine timings to obtain the requested torque value.

4. The method of claim 3, further comprising:
solving for at least one root of the pseudo-NN's simplified mathematical expression without having to rely on an inversion operation despite a high level of nonlinearity of the NN.

5. The method of claim 4, further comprising:
applying, by the processor, the torque prediction model comprising a composition of an activation function with multiple hidden layers wherein using a root solving algorithm to solve the simplified mathematical expression for a single remaining variable.

6. The method of claim 1, wherein the set of measured inputs comprise intake cam phasers (ICAM), exhaust cam phasers (ECAM), revolutions per minute (RPM), air per cylinder (APC), and spark timings of an operating vehicle.

7. The method of claim 6, wherein the pseudo-NN comprises a pseudo artificial NN (ANN) wherein the pseudo-ANN is a trained prediction model.

8. A system comprising:
a set of inputs obtained by a processor that pertain to one or more measurements of vehicle operations used to predict a torque requested of a vehicle;
a vehicle control system that controls one or more vehicle components and instructed by a torque prediction model implemented by the processor using an artificial neural network (ANN) to solve for a root of the torque prediction model used to obtain the torque request;
in response to the torque request, the processor configured to execute the torque prediction model of the ANN to receive a set of measurements as inputs for torque prediction;
the processor configured to substitute a set of multiple independent variables of the torque prediction model implemented by the ANN to formulate a functional mathematical expression in a pseudo-ANN that contains a reduced variable set comprising only one independent variable of a reduced set comprising multiple independent variables used by the ANN;
the processor configured to receive the set of measurements of a current operating vehicle as inputs to the pseudo-ANN for applying the torque prediction model with a single independent variable and one or more constants that have been substituted for a complete set of independent variables;
the processor configured to process the single independent variable in a pseudo-ANN that contains a simplified mathematical expression; and
the processor configured to solve for at least one root of the pseudo-ANN's simplified mathematical expression to obtain a root value without having to rely on an inversion operation of a mathematical expression that consists of an entire set of independent variables for predicting a requested torque value.

9. The system of claim 8, further comprising:
the processor configured to solve for at least one root of the pseudo-ANN's simplified mathematical expression to obtain a root value to predict a change in an air-per-cylinder (APC) control to obtain the requested torque value.

10. The system of claim 9, further comprising:
the processor configured to solve for at least one root of the pseudo-ANN's simplified mathematical expression to obtain a root value to predict a difference in spark control to change engine timings to obtain the requested torque value.

11. The system of claim 10, further comprising:
the processor configured to solve for at least one root of the pseudo-ANN's simplified mathematical expression without having to rely on an inversion operation despite a high level of nonlinearity of the ANN.

12. The system of claim 11, further comprising:
the processor configured to apply the torque prediction model comprising a composition of an activation function with multiple hidden layers wherein using a root solving algorithm to solve an expression for a single remaining variable.

13. The system of claim 12, wherein the set of measured inputs comprise intake cam phasers (ICAM), exhaust cam phasers (ECAM), revolutions per minute (RPM), APC, and spark timings of an operating vehicle.

14. The system of claim 13, wherein the pseudo-ANN is implemented based on a trained prediction model with a set of values.

15. A vehicle comprising:
a vehicle controller configured to control one or more components of the vehicle and comprising a processor wherein the processor is coupled to a neural network (NN) and configured to:
execute a torque prediction model of the NN to receive a set of measured vehicle operating inputs associated with torque prediction;
substitute a set of multiple independent variables of the torque prediction model implemented by the NN for a simplified mathematical expression in a pseudo-NN that contains a reduced variable set comprising one independent variable;
process the set of measured vehicle operating inputs by the pseudo-NN based on the torque prediction model by using at least only one independent variable and one or more constants substituted for a set of substituted independent variables in a pseudo-NN's simplified mathematical expression; and
solve for at least one root of the pseudo-NN's simplified mathematical expression by obtaining a root value without having to rely on an inversion operation of a mathematical expression that consists of an entire set of independent variables to obtain a requested torque value.

16. The vehicle apparatus of claim 15, wherein the set of measured inputs comprise intake cam phasers (ICAM), exhaust cam phasers (ECAM), revolutions per minute (RPM), air per cylinder (APC), and spark timings of an operating vehicle.

17. The vehicle apparatus of claim 16, further comprising:
the processor configured to:
solve for at least one root of the pseudo-NN's simplified mathematical expression to obtain a root value to predict a change in an air-per-cylinder (APC) control to obtain the requested torque value.

18. The vehicle apparatus of claim 17, further comprising:
the processor configured to:
solve for at least one root of the pseudo-NN's simplified mathematical expression to obtain a root value to predict a difference in spark control to change engine timings to obtain the requested torque value.

19. The vehicle apparatus of claim 18, further comprising:
the processor configured to:
solve for at least one root of the pseudo-NN's simplified mathematical expression without having to rely on an inversion operation despite a high level of nonlinearity of the NN.

20. The vehicle apparatus of claim 19, further comprising:
the processor configured to:
apply the torque prediction model comprising a composition of an activation function with multiple hidden layers wherein a root solving algorithm is used to solve an expression for a single remaining variable.

* * * * *